United States Patent [19]
Smith

[11] 3,884,604
[45] May 20, 1975

[54] CONTROL VALVE

[75] Inventor: Robert J. Smith, Birmingham, Mich.

[73] Assignee: Planet Corporation, Troy, Mich.

[22] Filed: Jan. 2, 1974

[21] Appl. No.: 430,218

[52] U.S. Cl. .................. 418/270; 91/26; 91/31; 60/468
[51] Int. Cl. ...... F15b 15/22; F01c 21/00; F03c 3/00
[58] Field of Search .......... 418/270; 60/468; 91/25, 91/26, 31–33

[56] References Cited
UNITED STATES PATENTS

| 1,942,927 | 1/1934 | Johnson et al. | 91/26 |
| 2,380,873 | 7/1945 | Schafer et al. | 91/26 |
| 3,033,169 | 5/1962 | Norwood | 91/26 |

Primary Examiner—John J. Vrablik
Attorney, Agent, or Firm—Ernest I. Giffon

[57] ABSTRACT

A valve assembly for controlling the acceleration and deceleration rates of a fluid motor used for relatively rapid, cyclical, intermittent operation. The valve assembly is mechanically coupled to the drive and/or motor output shaft and is in fluid communication both with the motor and with a fluid power system. Acceleration is controlled by a flow control and a pressure sensitive bypass valve, both of which are included in the valve body. Deceleration is controlled by the cooperation of a cam member, which is fixed to the motor output shaft, and the valve body.

4 Claims, 4 Drawing Figures

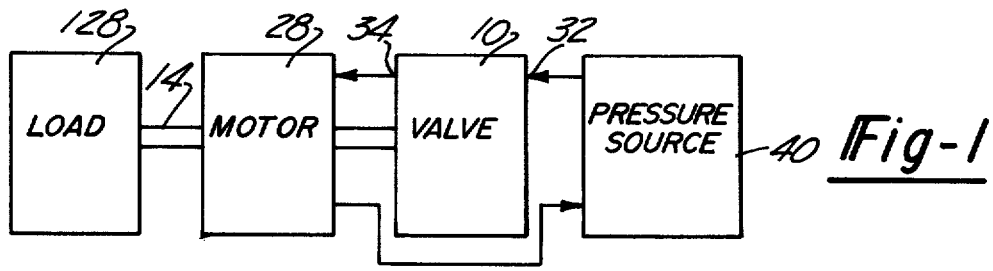
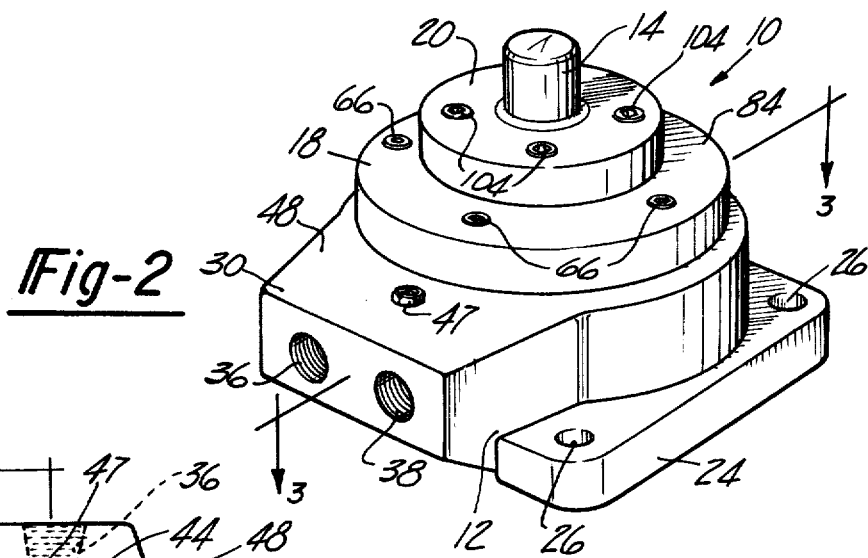
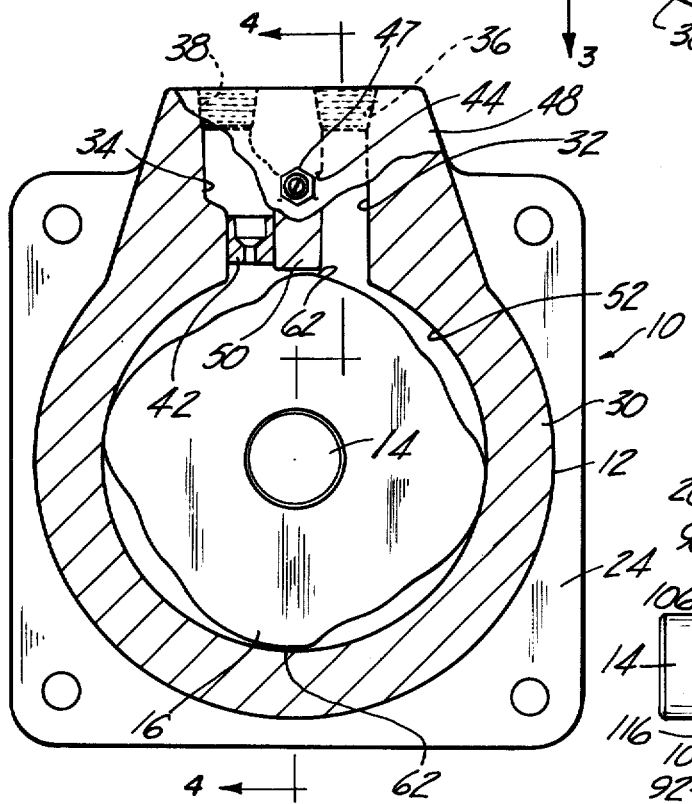
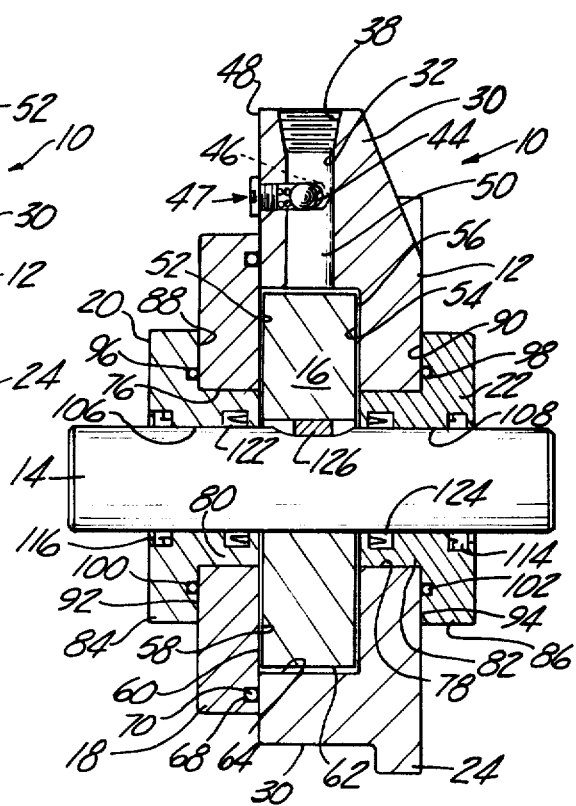

CONTROL VALVE

BACKGROUND OF THE INVENTION

I. Field of the Invention

The present invention relates to fluid control systems and more particularly to valves which control the rate of acceleration and deceleration of intermittently operated fluid motors.

II. Description of the Prior Art

The operation of efficient high production machinery frequently involves the rapid indexing of relatively massive objects such as machine work tables. A problem encountered in the design of such equipment is that of minimizing the acceleration forces brought about by the table rotation acting upon the structural components supporting the table. Successful solution of this problem results in the benefits of reduced machine weight, increased wear resistance of the rotating parts, and overall increased reliability.

SUMMARY OF THE PRESENT INVENTION

The present invention offers a solution to the problem that may be employed when a fluid motor is used to drive the load. A valve assembly is provided which controls both acceleration and deceleration of the motor. Acceleration is controlled by use of a pressure sensitive bypass valve and a flow control. Deceleration is controlled through use of a cam member connected to the output shaft of the motor and carried in the same housing as the bypass valve. The valve is situated hydraulically upstream of the motor and the differential pressure across the motor is varied in response to changes in the rotative position of the motor shaft by cooperation of the cam member with the valve to vary the flow area between the inlet and the outlet of the valve.

DESCRIPTION OF THE DRAWINGS

A better understanding of the present invention will achieved by those skilled in the art to which the invention pertains upon reference to the following specification and drawings in which like numerals refer to like parts throughout the several views and in which:

FIG. 1 is a schematic representation of a system employing the present invention;

FIG. 2 is a perspective view of a preferred rotary control valve of the present invention;

FIG. 3 is a cross-sectional view taken substantially along line 3—3 of FIG. 2; and FIG. 4 is a cross-sectional view of the preferred embodiment of the invention taken substantially along line 4—4 of FIG. 3.

DESCRIPTION OF THE PREFERRED EMBODIMENT

The preferred embodiment of the present invention comprises a rotary acceleration control valve 10 which as can best be seen by reference to FIGS. 3 and 4, includes a housing 12, an input shaft 14, a cam member 16, a cover plate 18, and seal housings 20 and 22.

Now referring to FIGS. 2, 3 and 4, the housing 12 preferably comprises a flange portion 24 having a plurality of holes 26 formed therethrough appropriately arranged for mounting the valve 10 to a motor 28 (FIG. 1), and an irregularly shaped portion 30.

As can best be seen in FIG. 3 the portion 30 of the housing 12 has formed therein an inlet passage 32 and an outlet passage 34. Each has a threaded portion 36 and 38, respectively, suitable for accepting fluid couplings (not shown) for connecting the inlet passage 32 to a source of pressurized fluid 40 (FIG. 1) and the outlet passage 34 to the inlet port of the fluid motor 28. As can best be seen in FIG. 3, a flow control 42 of the type commercially available is provided in the outlet passage 34. These flow controls are well known in the art and it is therefore not necessary to describe the flow control 42 in detail.

The inlet passage 32 and the outlet passage 34 are joined by an intermediate passage 44, the axis of which passage is transverse to those of the passages 32 and 34. As can best be seen in FIG. 4, a third bore 46 extending from a flat surface 48 of the portion 30 of the housing 12 perpendicularly intersects the intermediate passage 44 and is suitably formed to accept a cartridge-type pressure sensitive bypass valve 47 of the type commonly available.

As can best be seen in FIGS. 3–4, the inlet passage 32 and the outlet passage 34 are separated by a housing wall 50 and intersect a cylindrical bore 52 formed in the housing 12. The bore 52 is of sufficient depth and diameter to accept the cam member 16, allowing a minimum of axial and radial clearance between an inner flat surface 54 formed in the housing 12 and a cam member inner face 56, between an inner flat surface 58 of the cover plate 18 and an outer face 60 of the cam member 16, and between an outer radial extremity 62 of the cam member 16 and an inner wall 64 of the bore 52.

As can best be seen in FIG. 2, the cover plate 18 abuts the portion 30 of the housing 12 and is fastened thereto by means of screws 66 or the like, forming the means whereby the cam member 16 is axially retained within the housing 12. Referring to FIG. 4, a seal groove 68 is formed in the inner face 58 of the plate 18 having the appropriate dimensions to accept and properly compress a face-type, static, elastomeric seal 70. Also formed in the cover plate 18 is a through bore 76 equal to in size and arranged coaxially with a through bore 78 formed in the housing 12. These bores register with cylindrical portions 80 and 82, respectively, of seal housings 20 and 22, respectively.

Still referring to FIG. 4, the seal housings 20 and 22 comprise the cylindrical portions 80 and 82 and flange portions 84 and 86. Inner faces 88 and 90 of flange portions 84 and 86 abut an outer face 92 of the cover plate 18 and a flat rear surface 94 of the housing 12, respectively. Seal grooves 96 and 98 are formed in the flat faces 88 and 90 respectively in a manner similar to that employed for the seal groove 68 in the cover plate 18, and seals 100 and 102 are there assembled. The seal housings 20 and 22 are fastened to the cover plate 18 and the housing 12, respectively, by means of screws 104 or the like as best seen in FIG. 2.

Referring again to FIG. 4, through bores 106 and 108 are formed in the seal housings 20 and 22. They are of sufficiently large diameter to slidably engage the shaft 14. Bushings 114 and 116 rotatably engage and support the shaft 14. Seals 122 and 124 also rotatingly engage the shaft 14 and prevent fluid leakage along it.

The shaft 14 is rigidly connected to the cam member 16 by a key 126 or a similar locking device. The shaft 14 is also connected to the motor 28 and to a load 128 as illustrated schematically in FIG. 1.

Operation of the flow control device of the present invention is as follows:

Pressurized fluid from the hydraulic power source 40 is introduced at the valve inlet passage 32. When the cam member 16 is in the position shown in FIG. 3, a fluid seal is formed at the point of sliding contact between the outer radial extremity 62 of the cam member 16 and the inner diameter 52 of the housing 12 at the point where the housing wall 50 separates the inlet passage 32 and the outlet passage 34. Pressure in the inlet passage 32 increases until it reaches a predetermined level at which point the bypass valve 47 ports fluid to the motor 28. This bypass pressure adjustment serves to control the acceleration of the load 128 since the torque output of a fluid motor is directly proportional to the pressure differential across the motor.

As the motor 28 begins to rotate, driving the load 128, the shaft 14 also turns, carrying the cam member 16, which is attached to the shaft 14 through the key 126. This moves the outer extremity 62 of the cam member 16 away from sealing engagement with the housing wall 50. This puts the inlet passage 32 in fluid communication with the outlet passage 34, through which the fluid is directed to the motor 28.

The rate at which the fluid is supplied to the motor 38 is limited by operation of the flow control 42. The pressure at which the fluid is supplied during this phase of operation is controlled by the contour of the cam member 16. As can best be seen by reference to FIG. 3, the flow area opened between the cam member 16 and the housing wall 50 varies from zero to a maximum and back to zero as the shaft 14 turns 90°. This area change produces a corresponding variation in the inlet pressure of the motor 28 and thus its torque output. The motor 28 accelerates the load 128 at a rate limited by the pressure setting of the bypass valve 47. As the load 128 is turned the inlet pressure is first reduced as the bypass is closed, then increases to a maximum at the midpoint of the cycle, then reduces until the cam member 16 again closes the flow path between the inlet passage 32 and the outlet passage 34 at the 90° position, stopping to start a new cycle.

It is obvious that different cam contours which could vary the flow area in the same manner but over a different segment of a circle and with a different rate of pressure change with respect to rotary position change could be devised. In the preferred embodiment shown the 90° spacing used is meant to illustrate the desirable rapid indexing capability it affords.

The following claims define the invention.

I claim:

1. A valve assembly for controlling the acceleration and deceleration rates of a fluid motor comprising:
   rotary mechanical force input means mechanically connected to said motor;
   a fluid inlet passage in communication with a source of pressurized fluid;
   a fluid outlet passage in communication with the inlet port of said motor;
   a first valve means situated between said inlet passage and said outlet passage and capable of varying the pressure drop between said passages in response to changes in the rotary position of said force input means, said first valve means comprising a valve body having a central bore formed therethrough, said fluid inlet passage and said fluid outlet passage fluidly communicating with said central bore through the periphery of said central bore, and a cam member disposed in said central bore and secured for rotation to said force input means, said cam member employing one or more lobes which register with the periphery of said central bore for selectively communicating said inlet passage to said outlet passage in dependence on the rotational position of said cam member,
   second valve means situated between said inlet and outlet passages and capable of limiting the pressure differential between said passages; and
   flow control means situated in said outlet passage intermediate the point of communication of said first valve means and the inlet of said motor.

2. The valve assembly as defined in claim 1 wherein said force input means is directly connected to the drive shaft of the fluid motor.

3. A valve assembly for controlling the acceleration and deceleration rates of a fluid motor comprising:
   rotary mechanical force input means mechanically directly connected to the drive shaft of said motor;
   a fluid inlet passage in communication with a source of pressurized fluid;
   a fluid outlet passage in communication with the inlet port of said motor;
   a first valve means situated between said inlet passage and said outlet passage and capable of varying the pressure drop between said passages in response to changes in the rotary position of said force input means, said first valve means comprising:
   a valve body having a first bore formed therethrough and a second bore, coaxial with the first, extending from a first outer face to an inner face;
   a cam member employing one or more lobes at an axial position wherein it registers with said second housing bore,
   a cover having a bore formed therethrough and abutting said first face of said valve body;
   a first seal housing comprising a cylindrical portion registering with said cover through a bore and a flange portion abutting and fastened to the outer face of said cover, and having a through bore formed therein which rotatingly engages said motor shaft; and
   a second seal housing, identical in construction to said first seal housing abutting and fastened to a second outer face of said valve body;
   second valve means sitauted between said inlet and outlet passages and capable of limiting the pressure differential between said passages; and
   flow control means situated in said outlet passage intermediate the point of communication of said first valve means and the inlet of said motor.

4. The valve assembly as defined in claim 3, wherein said cam member is contoured such that the annular flow area defined by its outer radial extremity, the inner diameter of said second bore, said inner face, and said cover is varied from zero to a maximum to zero as said motor rotates its shaft through a predetermined arc.

* * * * *